United States Patent [19]

Kajiwara

[11] Patent Number: 4,796,747
[45] Date of Patent: Jan. 10, 1989

[54] FOODSTUFF DELIVERY MACHINE
[75] Inventor: Tokuji Kajiwara, Tokyo, Japan
[73] Assignee: Kajiwara Kogyo Kabushiki Kaisha, Tokyo, Japan
[21] Appl. No.: 24,415
[22] Filed: Mar. 11, 1987
[30] Foreign Application Priority Data Mar. 14, 1986 [JP] Japan .................. 61-37337

[51] Int. Cl.⁴ .............................. B65G 47/20
[52] U.S. Cl. ................... 198/535; 198/671; 222/168; 222/411
[58] Field of Search ............... 198/518, 535, 658, 671; 222/162, 167, 168, 410, 411

[56] References Cited

U.S. PATENT DOCUMENTS

| | | | |
|---|---|---|---|
| 612,181 | 10/1898 | Spurrier | 198/658 X |
| 2,791,355 | 5/1957 | Morgan, Jr. | 222/411 |
| 3,135,377 | 6/1964 | Miley | 198/671 X |
| 4,467,910 | 8/1984 | Siwersson et al. | 198/658 X |
| 4,603,774 | 8/1986 | Siwersson et al. | 198/518 |
| 4,621,726 | 11/1986 | Johansson | 198/658 X |

FOREIGN PATENT DOCUMENTS 1034480 7/1953 France ................. 198/658

Primary Examiner—Robert J. Spar
Assistant Examiner—D. Glenn Dayoan
Attorney, Agent, or Firm—Ladas & Parry

[57] ABSTRACT

A machine for delivering a viscous or paste-like foodstuff includes a hopper for receiving the foodstuff, the lower part of which is formed to include a funnel-shaped tapered portion, and a feed sleeve rotatably connected to the lower side of the hopper and having its lower end communicating with the exterior of a machine frame on which the hopper and feed sleeve are rotatably supported. A helical delivery blade is fixedly secured to the frame by a stationary shaft and includes a first blade portion fitted in the feed sleeve and a second blade portion of larger diameter fitted in the lower part of the tapered portion of the hopper, the first and second blade portions being continuous. A first drive mechanism rotates the feed sleeve and a second drive mechanism rotates the hopper in the same direction as the feed sleeve but at a lower speed, thereby producing a speed differential between the hopper and feed sleeve. By setting the speed differential to an appropriate value, the foodstuff contained in the hopper can be delivered to the feed sleeve continuously in an amount substantially the same as that fed through and out of the feed sleeve. The foodstuff may thus be delivered continuously without a compressing force acting thereon.

7 Claims, 1 Drawing Sheet

F I G. 1
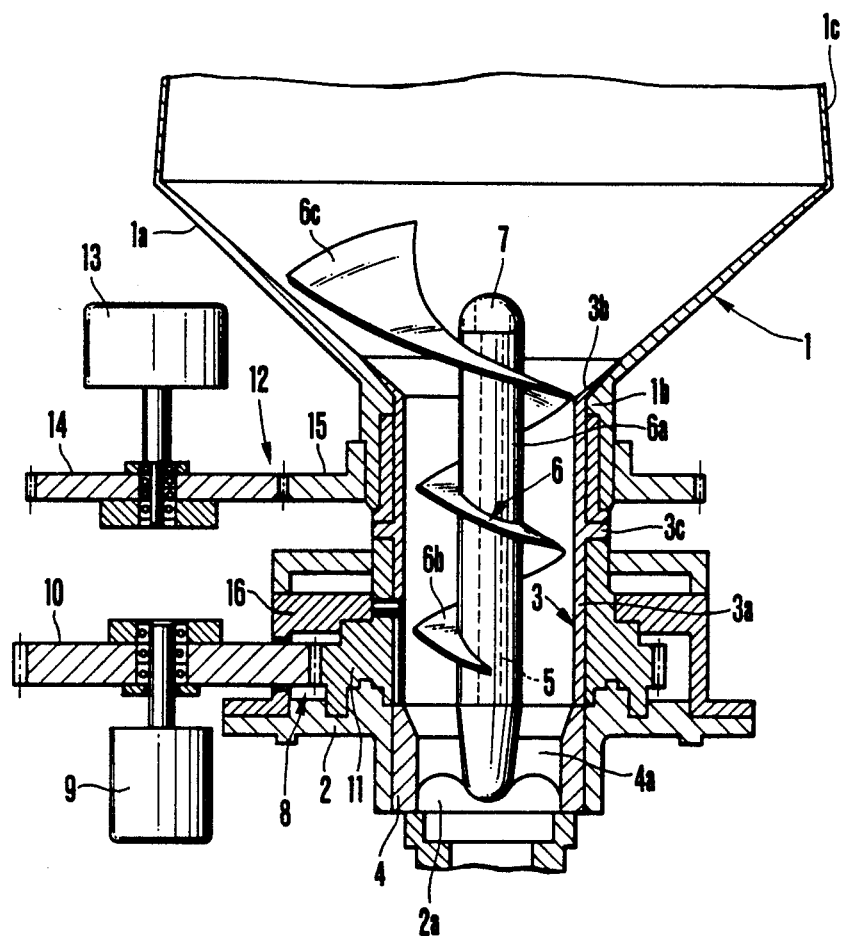

FOODSTUFF DELIVERY MACHINE

BACKGROUND OF THE INVENTION

This invention relates to a machine for continuously delivering a foodstuff such as bean jam.

The applicant has previously proposed a delivery machine of the abovementioned type in Japanese Utility Model Application No. 60-40531, filed on Mar. 20, 1985 now Laid-open Publication No. 158,196 published Oct. 1, 1986. The machine includes a hopper having a funnel-like tapered portion at its lower end, a feed sleeve integrated with the hopper and the tapered portion thereof, a frame on which the hopper is rotatably supported, a helical delivery blade fitted into the feed sleeve, a down-feeding blade fitted into the tapered portion of the hopper, a stationary shaft which fixes these blades to the frame, and a drive mechanism arranged externally of the hopper for rotating the same. In the operation of the foodstuff delivery machine having this construction, the hopper is rotated by the drive mechanism, while the helical delivery blade and down-feeding blade remain stationary, thereby delivering the foodstuff, which is contained in the hopper, out of the lower end of the sleeve without the foodstuff being strongly compressed or agitated.

In comparison with a foodstuff delivery machine of the type in which the helical delivery blade and down-feeding blade are rotated and the hopper is stationary, the previously proposed delivery machine described above is better at preventing foodstuff deterioration and a decline in the commodity value thereof because the foodstuff is not strongly compressed or agitated. However, the rotating speed of the down-feeding blade relative to the tapered portion of the hopper and the rotating speed of the delivery blade relative to the feed sleeve are the same, while the down-feeding blade has a larger outer diameter. As a result, there is a difference in the relative peripheral speeds of these blades on the hopper side and feed sleeve side. Owing to this peripheral speed differential, the amount of the foodstuff fed from the hopper to the sleeve is greater than the amount of foodstuff delivered through the interior of the sleeve, so that a compressing force acts upon the foodstuff in the sleeve. Consequently, if the delivery machine is run for an extended period of time, the quality of the foodstuff deteriorates, as by undergoing a change in color, due to the compressing force acting thereon.

SUMMARY OF THE INVENTION

An object of the present invention is to provide a foodstuff delivery machine capable of being run continuously for an extended period of time without degrading the quality even of a delicate foodstuff such as bean jam.

According to the present invention, the foregoing object is attained by providing a foodstuff delivery machine comprising a fixed machine frame, a hopper rotatably supported on the fixed machine frame and having a lower tapered end portion, a feed sleeve rotatably supported on the fixed machine frame and having an upper end rotatably connected to the lower tapered end portion of the hopper and a lower end communicating with an outer side of the fixed machine frame, an upstanding stationary shaft fixed to the fixed machine frame, a helical delivery blade fixedly secured to the stationary shaft and having a first helical blade portion fitted in the feed sleeve and a second helical blade portion fitted in the lower tapered end portion of the hopper, the second helical blade portion being continuous with the first helical blade portion and having a larger outer diameter, a first drive mechanism arranged externally of the feed sleeve for rotating the feed sleeve in a given direction at a first speed, and a second drive mechanism arranged externally of the hopper for rotating the hopper in the same direction as the feed sleeve at a second speed lower than the first speed. The first and second drive mechanisms have means for adjusting the speed difference between the hopper and feed sleeve to a desired value.

The feed sleeve and hopper are rotated independently of each other and in the same direction by the first and second drive mechanisms, respectively, with the hopper being rotated slower than feed sleeve to produce a speed differential set to an appropriate value. This arrangement enables a foodstuff such a bean jam contained in the hopper to be delivered to the feed sleeve continuously in an amount substantially the same as that fed through and out of the feed sleeve. As a result, the foodstuff can be fed from the tapered portion of the hopper to the feed sleeve smoothly without a compressing force acting upon the foodstuff. Accordingly, the delivery machine can be operated continously for an extended period of time without damaging a foodstuff, such as bean jam, the quality of which is very susceptible to deterioration.

Other features and advantages of the present invention will be apparent from the following description taken in conjunction with the accompanying drawing.

BRIEF DESCRIPTION OF THE DRAWING

The sole Figure is a longitudinal sectional view illustrating a preferred embodiment of a foodstuff delivery machine according to the present invention.

DESCRIPTION OF THE PREFERRED EMBODIMENT

As shown in the Figure, a preferred embodiment of a foodstuff delivery machine according to the present invention includes a hopper 1 for receiving a foodstuff. The hopper 1 has a generally funnel-shaped tapered portion 1a at its lower end, a connecting sleeve 1b of a right cylindrical configuration formed integral with the lower end of the tapered portion 1a, and a generally circular cylinder 1c formed integral with the tapered portion 1a and having an open upper end of gradually reduced diameter. The connecting sleeve 1b of hopper 1 is fitted in a machine frame 2 so as to be rotatable about its longitudinal axis, and the lower end of the tapered portion 1a is supported on the frame 2.

The machine further includes a feed sleeve 3 the upper end of which is inserted into the lower end portion of the hopper 1 so as to be rotatable relative thereto. The feed sleeve 3 includes a right cylindrical portion 3a the upper end of which is formed to include a flared enlarged diameter portion 3b of small length. The flared portion 3b is supported on the lower end of the tapered portion 1a of hopper 1. The upper part of the right cylindrical portion 3a is inserted into the connecting sleeve 1b of hopper 1. A flange 3c in abutting contact with the lower end of the connecting sleeve 1b is provided on the outer periphery of the right cylindrical portion 3a, and the lower end of the right cylindrical portion 3a is supported on the peripheral portion of a delivery hole 2a in the frame 2. Thus, the lower end of the feed sleeve 3 communicates with delivery hole 2a, which opens to the outside of the machine frame 2.

A stationary shaft 5 is held erect via an arm 4a of a support sleeve 4 at the center of the delivery hole 2a in frame 2. The stationary shaft 5, support sleeve 4, delivery sleeve 3 and hopper 1 are coaxially arranged.

The machine includes a helical delivery blade 6 having a mounting sleeve 6a removably fitted on the stationary shaft 5 and secured to the arm 4 by a nut 7 tightened on the upper end portion of the stationary shaft 5. The delivery blade 6 includes a helical lower portion 6b secured to the outer periphery of the mounting sleeve 6a, and a helical upper portion 6c continuous with the helical lower portion 6b and having an outer diameter that grows successively larger upwardly from the helical lower portion 6b. The helical lower portion 6b is fitted into the right cylindrical portion 3a of feed sleeve 3 with almost no clearance between itself and the inner wall of the sleeve 3, and the helical upper portion 6c is fitted into the flared portion 3b of feed sleeve 3 and the tapered portion 1a of hopper 1 with almost no clearance between itself and the inner walls of the flared portion 3b and feed sleeve 3.

A first drive mechanism 8 for rotating the delivery cylinder 3 includes a motor 9 equipped with a stepless transmission and fixed to the frame 2, a driving gear 10 driven rotatively by the motor 9, and a driven gear 11 meshing with the driving gear 10. The driven gear 11 is freely rotatably supported on the frame 2 but has its axial motion restricted by a restraining member 16. The right cylindrical portion 3a of feed sleeve 3 is detachably joined to the driven gear 11. The first drive mechanism 8 is arranged externally of the feed sleeve 3.

A second drive mechanism 12 for rotating the hopper 1 in the same direction as the feed sleeve 3 but at a lower speed includes a motor 13 equipped with a stepless transmission, a driving gear 14 driven by the motor 13, and a driven gear meshing with the driving gear 14. The connecting sleeve 1b of hopper 1 is fixedly joined to the driven gear 15. The second drive mechanism 12 is arranged externally of the hopper 1.

In operation, a foodstuff such a bean jam is placed in the hopper 1 and the motors 9, 13 of the respective first and second drive mechanisms 8, 12 are started, whereupon the feed sleeve 3 is rotated by motor 9 via the driving gear 10 and driven gear 11, and the hopper 1 is rotated in the same direction as the sleeve 3 but at a lower speed by motor 13 via the driving gear 14 and driven gear 15. By performing a trial run, the difference in speed between the feed sleeve 3 and hopper 1 is set beforehand to an appropriate value so that the resulting rotation of the feed sleeve 3 and hopper 1 relative to the stationary delivery blade 6 will cause the foodstuff in hopper 1 to be fed through and out of the feed sleeve 3 in an amount equal to that introduced into the feed sleeve 3 from the tapered portion 1a of the hopper 1. The foodstuff exits from the opening at the lower end of the feed sleeve 3, passes through the delivery hole 2a and is delivered continuously in columnar form below the frame 2.

It should be noted that the hopper 1, driven gear 15, nut 7 and delivery blade 6 are detachable and can be removed for cleaning following use.

There are occasions where a molding cutting machine is provided below the foodstuff delivery machine of the invention so that the continuously delivered foodstuff can be molded and cut. In another example of using the delivery machine of the invention, an arrangement is adopted in which the foodstuff delivered by the machine is covered with a different foodstuff delivered by a separate foodstuff delivery machine, whereby a foodstuff composed of several layers is continuously delivered. This layered foodstuff is then molded and cut.

Thus, in accordance with the invention described and illustrated hereinabove, the helical delivery blade 6 secured to the frame 2 is fitted in the feed sleeve 3 and hopper 1, and the feed sleeve 3 and hopper 1 are rotated by the first and second drive mechanisms 8, 12 in the same direction, with the hopper 1 being rotated slower than the feed sleeve 3. Therefore, even though the portion 6c of delivery blade 6 fitted in the tapered portion 1a of hopper 1 has a diameter larger than that of the portion 6b fitted in the feed sleeve 3, the foodstuff contained in hopper 1 can be continuously introduced to the feed sleeve 3 in an amount substantially the same as that fed through the interior of the feed sleeve 3 merely by setting the speed differential between the feed sleeve 3 and hopper 1 to a suitable value. This enables the foodstuff to be smoothly introduced from the tapered portion 1a of hopper 1 to the feed sleeve 3 without subjecting the foodstuff to a compressing force. As a result, the machine can be operated continuously for an extended period of time without degrading even delicate foodstuffs that are easily damaged.

As many apparently widely different embodiments of the present invention can be made without departing from the spirit and scope thereof, it is to be understood that the invention is not limited to the specific embodiments thereof except as defined in the appended claims.

What we claim is:

1. A foodstuff delivery machine for use with delicate food products, such as bean jam, and for delivering the delicate food products without subjecting the delicate food product to undue compression forces, the delivery machine comprising:

a fixed machine frame;

a hopper rotatably supported on said fixed machine frame and having a lower tapered end portion;

a feed sleeve rotatably supported on said fixed machine frame and having an upper end rotatably connected to the lower tapered end portion of said hopper and a lower end communicating with an outer side of said fixed matching frame;

an upstanding stationary shaft fixed to said fixed machine frame;

a helical delivery blade fixedly secured to said stationary shaft and having a first helical blade portion fitted in said feed sleeve and a second helical blade portion fitted in the lower tapered end portion of said hopper, said second helical blade portion being continuous with said first helical blade portion and having a larger outer diameter;

a first drive mechanism arranged externally of said feed sleeve for rotating said feed sleeve in a given direction at a first speed; and a second drive mechanism arranged externally of said hopper for rotating said hopper in the same direction as said feed sleeve at a second speed lower than said first speed.

2. The foodstuff delivery machine according to claim 1, wherein said first drive mechanism comprises:

a first motor fixedly secured to said fixed machine frame;

a first driving gear driven rotatively by said first motor, and;

a first driven gear meshing with said first driving gear and attached to said feed sleeve.

3. The foodstuff delivery machine according to claim 1, wherein said second drive mechanism comprises:
   a second motor fixedly secured to said fixed machine frame;
   a second driving gear driven rotatively by said second motor; and
   a second driven gear meshing with said second driving gear and joined to said hopper.

4. The foodstuff delivery machine according to claim 1, wherein said fixed machine frame has a delivery hole open to the outer side thereof, the lower end of said feed sleeve being supported on said fixed machine frame about said delivery hole.

5. A machine for delivering a foodstuff comprising:
   (a) a frame;
   (b) a hopper rotatably mounted with respect to said frame, said hopper having an upwardly directed opening for receiving foodstuff and having a lower tapered end portion, the opening being of a larger overall diameter than the diameter of the tapered end portion;
   (c) a feed sleeve rotatably mounted with respect to said frame, said sleeve having an upper flared portion which lies against at least a portion of the lower tapered end portion of the hopper, the maximum diameter of the upper flared portion being greater than the minimum diameter of the lower tapered end portion of said hopper;
   (d) a helical delivery blade disposed in said feed sleeve and in said hopper, said helical delivery blade having a first portion disposed within said feed sleeve and a continuous second portion, the diameter of the second portion increasing from the point of juncture with the first portion to the end of the second portion, the diameter of the second portion increasing so as to come into close proximity with the tapered portion of said hopper; and
   (e) a drive mechanism for rotating said feed sleeve in a first direction at a first speed and for rotating said hopper in said first direction but at a second speed slower than said first speed.

6. The delivery machine of claim 5, wherein said hopper has a mouth for receiving said foodstuff, said mouth having a slightly smaller diameter than the largest diameter of said hopper.

7. The delivery machine of claim 5, wherein the first portion of said helical delivery blade is fitted into the feed sleeve with almost no clearance between itself and an inner wall of said sleeve.

* * * * *